(12) United States Patent
Takizawa et al.

(10) Patent No.: US 10,890,239 B2
(45) Date of Patent: Jan. 12, 2021

(54) EXTERNALLY TOOTHED GEAR FOR STRAIN WAVE GEARING

(71) Applicant: HARMONIC DRIVE SYSTEMS INC., Tokyo (JP)

(72) Inventors: Noboru Takizawa, Azumino (JP); Xin Yue Zhang, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 111 days.

(21) Appl. No.: 16/348,884

(22) PCT Filed: Nov. 30, 2016

(86) PCT No.: PCT/JP2016/085642
§ 371 (c)(1),
(2) Date: May 10, 2019

(87) PCT Pub. No.: WO2018/100701
PCT Pub. Date: Jul. 6, 2018

(65) Prior Publication Data
US 2019/0277383 A1    Sep. 12, 2019

(51) Int. Cl.
*F16H 49/00*   (2006.01)
*F16H 1/32*   (2006.01)

(52) U.S. Cl.
CPC .............. *F16H 49/001* (2013.01); *F16H 1/32* (2013.01); *F16H 2049/003* (2013.01)

(58) Field of Classification Search
CPC .......................... F16H 49/001; F16H 2049/003
See application file for complete search history.

(56) References Cited

U.S. PATENT DOCUMENTS 5,269,202 A * 12/1993 Kiyosawa ............. F16H 49/001
                                                         74/640
5,715,732 A *  2/1998 Takizawa ............. F16H 49/001
                                                         74/640
(Continued)

FOREIGN PATENT DOCUMENTS

JP    S61173851 U    10/1986
JP    H03118346 U    12/1991
(Continued)

OTHER PUBLICATIONS

International Search Report (with English translation) and Written Opinion issued in corresponding International Patent Application No. PCT/JP2016/085642, 6 pages (dated Feb. 9, 2017).

*Primary Examiner* — Terence Boes
(74) *Attorney, Agent, or Firm* — Buchanan Ingersoll & Rooney PC

(57) ABSTRACT

In a silk hat-shaped external gear for a strain wave gearing, $t(A)>t(C)>t(D)>t(B)$ is satisfied, where the thicknesses of the inner circumferential end (A), the middle part (B) and the outer circumferential end (C) of the diaphragm body portion of a diaphragm are $t(A)$, $t(B)$ and $t(C)$, and where the thickness of the barrel-side end part (D) of the curved portion of the diaphragm is $t(D)$. With reference to the thickness of the middle part (B), the thickness of the inner circumferential end (A) of the diaphragm is set so as to be thicker than conventional silk hat-shaped external gears. It is possible to realize an externally toothed gear capable of preventing diaphragm rupture due to thrust force at high load torque and having high fatigue strength.

6 Claims, 3 Drawing Sheets

(56) References Cited

U.S. PATENT DOCUMENTS

| | | | |
|---|---|---|---|
| 5,850,765 A | 12/1998 | Shirasawa | |
| 6,202,508 B1* | 3/2001 | Takizawa | F16H 49/001 |
| | | | 74/411 |
| 2003/0233909 A1* | 12/2003 | Tanioka | F16H 49/001 |
| | | | 74/640 |
| 2014/0165758 A1* | 6/2014 | Moune | F16H 49/001 |
| | | | 74/412 R |
| 2017/0227106 A1* | 8/2017 | Takizawa | F16H 49/001 |
| 2018/0187763 A1* | 7/2018 | Xie | F16H 49/001 |

FOREIGN PATENT DOCUMENTS

| | | |
|---|---|---|
| JP | H08312730 A | 11/1996 |
| JP | H09273609 A | 10/1997 |
| JP | 3580506 B2 | 7/2004 |
| JP | 2015102181 A | 6/2015 |

\* cited by examiner

EXTERNALLY TOOTHED GEAR FOR STRAIN WAVE GEARING

TECHNICAL FIELD

The present invention relates to a silk-hat-type strain wave gearing equipped with a silk-hat-shaped flexible externally toothed gear. More specifically, the present invention relates to an externally toothed gear configured to be used for a strain wave gearing, having enhanced fatigue strength in an operating state in which a high-load torque is applied.

BACKGROUND ART

An externally toothed gear for a silk-hat-type strain wave gearing is provided with a cylindrical barrel, a diaphragm which is continuous with one end of the barrel and spreads radially outward, and an annular thick-walled boss which is continuous with an outer circumferential end of the diaphragm. External teeth are integrally formed in an outer circumferential portion of an opening end on a distal-end side of the barrel.

In the externally toothed gear having this shape, because the diaphragm spreads toward an outside in a radial direction, an outside diameter of the strain wave gearing is increased relative to a cup-type strain wave gearing equipped with a cup-shaped externally toothed gear. The outside diameter of the diaphragm may be reduced in order to reduce the outside diameter of the strain wave gearing. However, the diaphragm is repeatedly subjected to a large bending stress due to deformation of the barrel, which is repeatedly flexed in the radial direction by a wave generator. It is therefore undesirable to reduce the diameter of the diaphragm, because stress occurring in an inner circumferential end part and an outer circumferential end part of the diaphragm increases in inverse proportion to the diaphragm diameter, and stress becomes concentrated in these portions.

Patent Document 1 discloses a silk-hat-type strain wave gearing, wherein stress concentration occurring in a diaphragm of an externally toothed gear that is flexed by a wave generator is mitigated and strength of the diaphragm is increased. In the externally toothed gear disclosed in Patent Document 1, a thickness of the diaphragm is made greater in an inner circumferential end and an outer circumferential end than in a middle part therebetween, and stress concentration in the diaphragm is mitigated.

Patent Document 2 discloses an improvement of the invention disclosed in Patent Document 1. In Patent Document 2, a thickness of a diaphragm part of an externally toothed gear is at maximum at an inner circumferential end thereof, and is at minimum in a middle part between the inner circumferential end and an outer circumferential end. Stress concentration in the diaphragm part of the externally toothed gear is thereby even further mitigated, and a stress state of the diaphragm can be made uniform.

Patent Document 3 discloses using a streamline to prescribe a cross-sectional shape of a base portion for attachment of the diaphragm to a boss.

PRIOR ART DOCUMENTS

Patent Documents

Patent Document 1: JU 3-118346 A
Patent Document 2: JP 3580506 B
Patent Document 3: JU 61-173851 A

SUMMARY OF THE INVENTION

Problems to be Solved by the Invention

Conventionally, the diaphragm shape of a silk-hat-shaped externally toothed gear was designed through use of a stress analysis that considered ellipsoidal flexural deformation by a wave generator, an applied load torque, and mounting error of the externally toothed gear. With the aim of developing a product that can cope with high load, endurance testing of an externally toothed gear was performed with a further increased current load. It was assumed from current stress analysis that a diaphragm would not experience fatigue fracture even under the aforementioned increased load, but fatigue fracture was confirmed in results of endurance testing of a diaphragm.

The inventors investigated the cause of diaphragm breakage on the basis of stress analysis and the like, and considered the effect of a thrust force occurring in the externally toothed gear due to load torque in the stress analysis. As a result, the inventors confirmed that a phenomenon of diaphragm breakage observed in an actual endurance test of an externally toothed gear in a state of high load torque can be reproduced in stress analysis as well.

The inventors focused on the thrust force caused by the load torque, which had not conventionally been considered in designing the diaphragm shape of an externally toothed gear. On this basis, the inventors designed a diaphragm shape while taking into account the effect of the thrust force. The inventors discovered that by taking the thrust force caused by the load torque into account, breakage of the diaphragm can be suppressed even in a state of high load torque, and durability of the externally toothed gear can be increased.

An object of the present invention is to provide an externally toothed gear configured to be used for a strain wave gearing, provided with a diaphragm shape whereby, on the basis of the above new knowledge, fatigue strength of the diaphragm at high load torque can be enhanced.

Means of Solving the Problems

An externally toothed gear configured to be used for a strain wave gearing according to the present invention, the externally toothed gear being ellipsoidally flexed by a wave generator, and a state of partial meshing with a rigid internally toothed gear being formed therein, is characterized by having:

a cylindrical barrel provided with one end being an open end; external teeth formed on a portion of an outer circumferential surface of the barrel on a side of the open end thereof; a diaphragm which is continuous with another end of the barrel and spreads outward in a radial direction of the barrel; and an annular boss formed continuously with an outer circumferential end of the diaphragm, wherein the diaphragm has:

a diaphragm body portion extending in the radial direction;

a curved portion which is continuous with an inner circumferential end of the diaphragm body part, curves toward the barrel along a center axis from a direction inward in the radial direction, and is connected to the barrel; and a boss base portion which extends outward in the radial direction from an outer circumferential end of the diaphragm body part, and is connected to an inner circumferential surface of the boss; and wherein a thickness of the diaphragm gradually decreases from a position of the boss base portion connected to the inner circumferential surface of the boss to a middle part between the outer circumferential end and the inner circumferential end in the diaphragm body part, and the thickness of the diaphragm gradually increases from the middle part to the inner circumferential end of the diaphragm body part; and thicknesses of the inner circumferential end, the middle part, and the outer circumferential end of the diaphragm, and a thickness of a barrel-side end part of the curved portion connected to the barrel satisfy $$t(A)>t(C)>t(D)>t(B),$$

where t(A) is the thickness of the inner circumferential end, t(B) is the thickness of the middle part, t(C) is the thickness of the outer circumferential end, and t(D) is the thickness of the barrel-side end part.

In the present invention, the thickness of the diaphragm is made greater in the inner circumferential end and outer circumferential end than in the middle part in the diaphragm body portion, and the thickness of the inner circumferential end is greater than that of the outer circumferential end. The thickness of the barrel-side end part in the curved portion of the diaphragm is also greater than that of the middle part, which has the smallest thickness of the diaphragm body portion, and the thickness of the barrel-side end part is less than that of the outer circumferential end of the diaphragm body portion.

By setting the thickness of each portion of the diaphragm in this manner, stress can be smoothly distributed along the diaphragm from the inner circumferential end to the outer circumferential end thereof. In particular, concentration of stress that occurs in the diaphragm due to a thrust force from the load torque can be mitigated, and the maximum stress can be reduced. As a result, it is possible to prevent or suppress breakage of the diaphragm in an operating state of high load torque, and durability of the externally toothed gear can be increased.

Preferably, with reference to the thickness t(B) of the middle part of the diaphragm body portion, the thickness t(A) of the inner circumferential end of the diaphragm body portion satisfies $$1.2<t(A)/t(B)<2.7;$$

the thickness t(C) of the outer circumferential end of the diaphragm body portion satisfies $$1.0<t(C)/t(B)<2.3;\text{ and}$$

the thickness t(D) of the barrel-side end part of the curved portion of the diaphragm satisfies $$1.0<t(D)/t(B)<2.3.$$

Specifically, the thickness t(D) of the barrel-side end part of the curved portion of the diaphragm is set so as to be greater than the thickness t(B) of the middle part of the diaphragm body portion. The thickness t(A) of the inner circumferential end of the diaphragm body portion, using the thickness t(B) of the middle part as a reference, is also set so as to be greater than in the case of the conventional externally toothed gear.

By setting the thickness of each part of the diaphragm in this manner, stress concentration that occurs in the diaphragm due to the thrust force can be even further mitigated, and the maximum stress can be significantly reduced in an operating state of high load torque. Fatigue strength of the diaphragm can thereby be enhanced.

In the curved portion of the diaphragm, a middle position extending from the inner circumferential end connected to the diaphragm body portion to the barrel-side end part connected to the barrel is referred to herein as a curved-portion middle position. In this case, between the inner circumferential end of the curved portion and the curved-portion middle position thereof, the thickness of the diaphragm preferably gradually increases from the inner circumferential end to the curved-portion middle position and gradually decreases from the curved-portion middle position to the barrel-side end part, and preferably, $$t(E)>t(A)$$

is satisfied, where t(E) is the thickness of the curved-portion middle position, and $$1.3<t(E)/t(B)<2.8$$

is satisfied with reference to the thickness t(B) of the middle part of the diaphragm body portion.

In the barrel, a thickness of a cylinder portion extending from an external tooth formation portion, in which external teeth are formed, to the barrel-side end part of the curved portion of the diaphragm can be configured so as to be constant, and to be the same as the thickness t(D) of the barrel-side end part.

MODE FOR CARRYING OUT THE INVENTION

Embodiments of the silk-hat-type strain wave gearing to which the present invention is applied will be described below with reference to the accompanying drawings.

Figure 1:
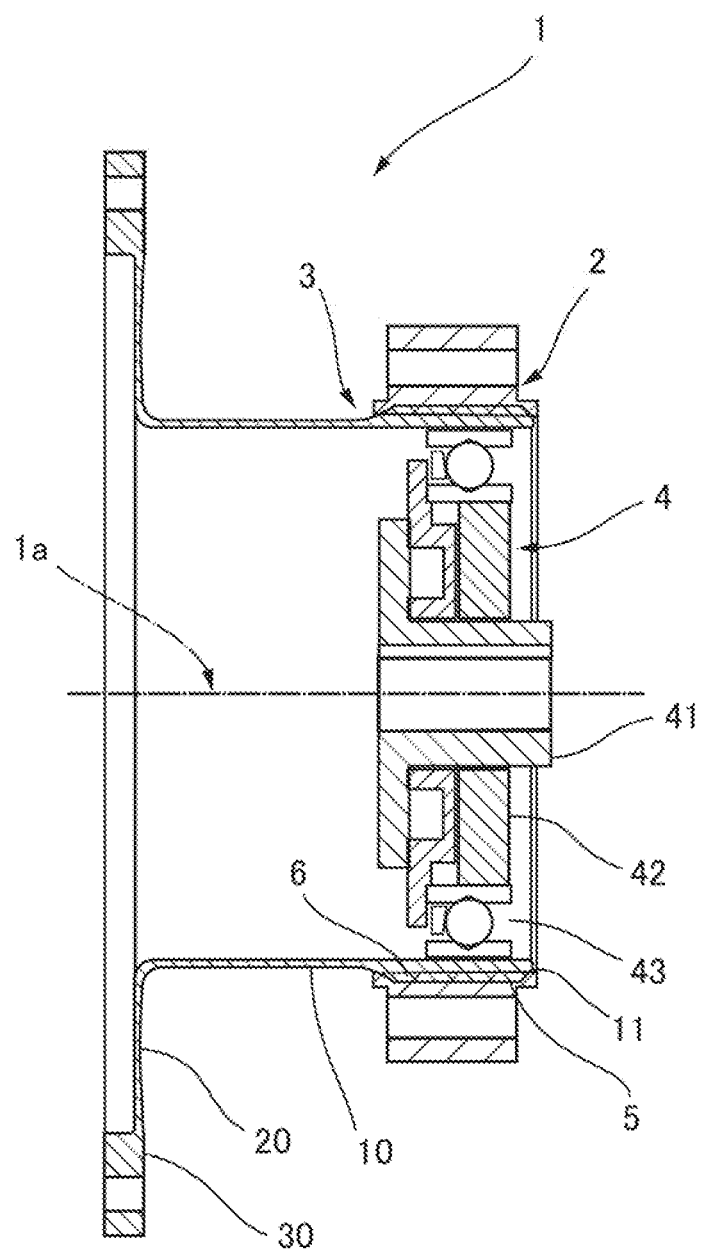
FIG. 1 is a schematic longitudinal sectional view of a silk-hat-type strain wave gearing according to an embodiment of the present invention.
Figure 2:
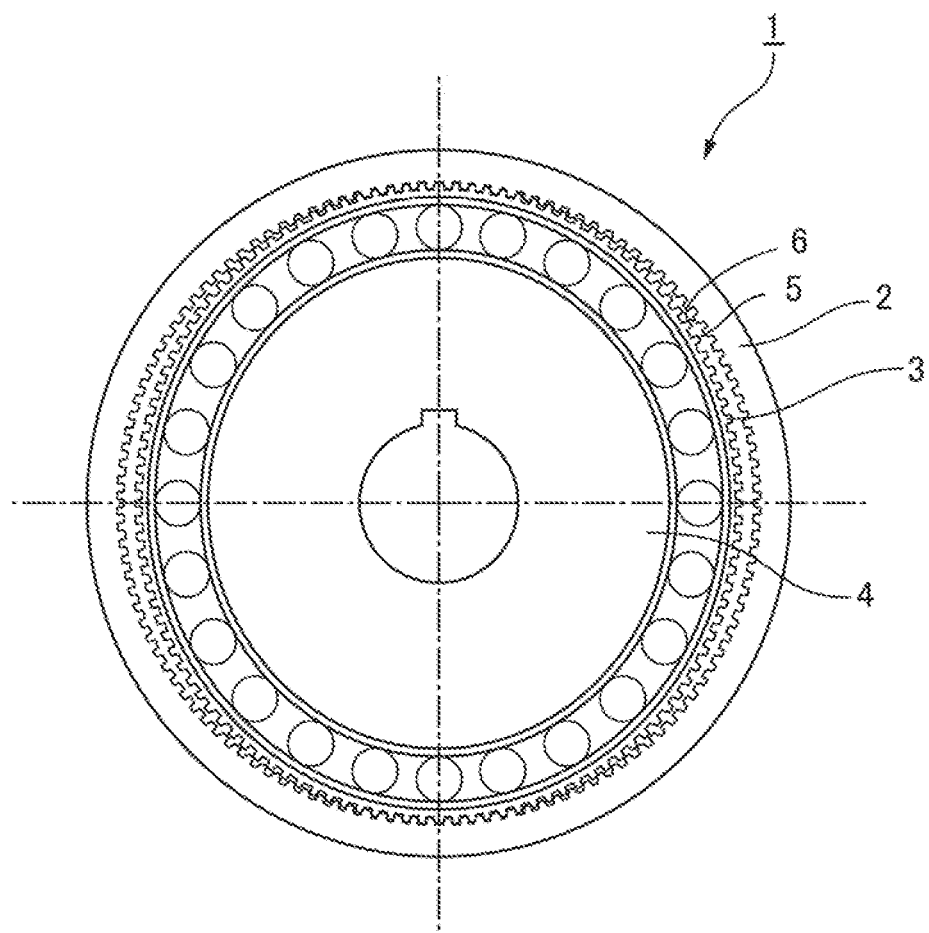
FIG. 2 is an explanatory drawing illustrating a state of meshing of teeth of the strain wave gearing of FIG. 1.

FIG. 1 is a schematic longitudinal sectional view illustrating the overall structure of the silk-hat-type strain wave gearing according to the present embodiment, and FIG. 2 is an explanatory diagram illustrating a state of meshing of teeth. A strain wave gearing 1 is constituted from an annular rigid internally toothed gear 2, a silk-hat-shaped flexible externally toothed gear 3 disposed coaxially therewith and on an inside thereof, and a wave generator 4 which has an ellipsoidal outline and is fitted inside the externally toothed gear 3.

The externally toothed gear 3 is provided with a barrel 10, a diaphragm 20, and a boss 30, and is silk-hat shaped overall. The barrel 10 is cylindrical and capable of flexing. One end of the barrel 10 is an open end 11. The diaphragm 20 spreads radially outward continuously with another end of the barrel 10. The annular boss 30 having a rectangular cross section is formed continuously with an outer circumferential edge of the diaphragm 20. The boss 30 is a rigid portion for attaching the externally toothed gear 3 to another member (not illustrated).

The wave generator 4 is constituted from a hollow hub 41, an ellipsoidal rigid cam plate 42 fitted on an outer circumference of the hollow hub 41, and a wave bearing 43 fitted on an outer circumference of the rigid cam plate 42. An external tooth formation portion of the flexible externally toothed gear 3 in which external teeth 5 thereof are formed is ellipsoidally flexed by the wave generator 4. The external teeth 5 of the externally toothed gear 3 are meshed with internal teeth 6 of the rigid internally toothed gear 2 at two locations positioned at both ends of a major axis of an ellipse.

When the wave generator 4 rotates about a center axis 1a, the meshing positions of both gears rotate in a circumferential direction. By this rotation, relative rotation occurs between the externally toothed gear 3 and the internally toothed gear 2 in accordance with a difference between the number of external teeth 5 and the number of internal teeth 6. For example, in a configuration in which the internally toothed gear 2 is fixed and the wave generator 4 is a high-speed rotational input element, the externally toothed gear 3 becomes a reduced-speed rotational output element, and a rotational output that is reduced in speed in accordance with the difference in the number of teeth between both gears.

Figure 3:
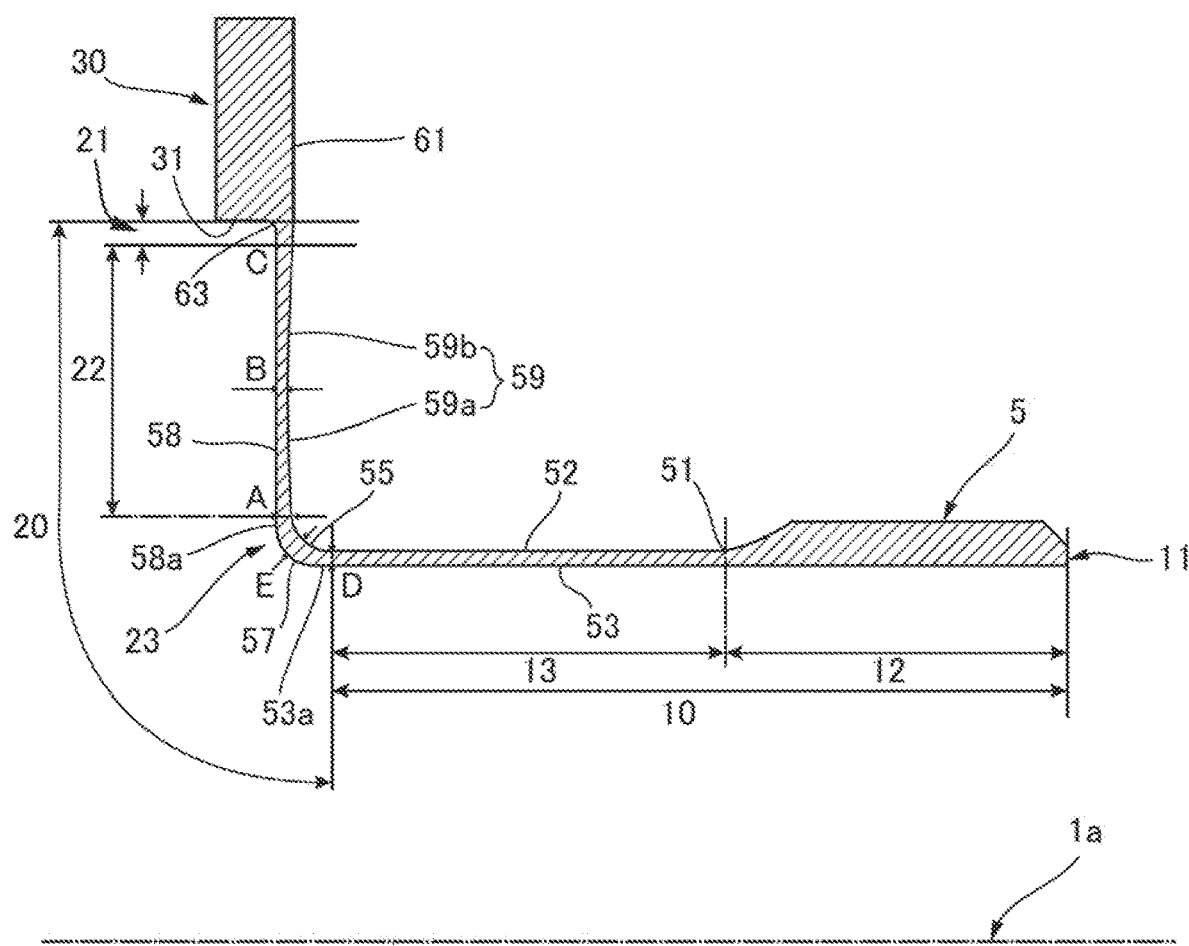
FIG. 3 is a half sectional view illustrating an externally toothed gear of FIG. 1.

FIG. 3 is half sectional view in which the silk-hat-shaped externally toothed gear 3 is cut by a plane that includes the center axis 1a thereof. The barrel 10 of the externally toothed gear 3 is provided with an external tooth formation portion 12, one end of which is the open end 11, and a cylinder portion 13 having a constant thickness, extending from the external tooth formation portion 12 to the diaphragm 20. The external teeth 5 are formed in a portion on an outer circumferential surface of the external tooth formation portion 12.

The thickness of the cylinder portion 13 is constant in the present example, but the cross-sectional shape of the cylinder portion 13 can also be set so that a wall thickness thereof gradually decreases toward the external tooth formation portion 12 from a diaphragm 20 side.

The diaphragm 20 is provided with a boss base portion 21, a diaphragm body portion 22, and a curved portion 23. The diaphragm body portion 22 extends in a radial direction perpendicular to the center axis 1a. The curved portion 23 is continuous with an inner circumferential end A of the diaphragm body portion 22, and curves toward the barrel 10 along the center axis 1a from a radially inward direction. A barrel-side end part D of the curved portion 23 is connected to the cylinder portion 13 of the barrel 10. The boss base portion 21 extends radially outward from an outer circumferential end C of the diaphragm body portion 22, and is connected to a circular inner circumferential surface 31 of the boss 30.

More specifically, an inner circumferential surface portion of the cylinder portion 13 of the barrel 10 of the externally toothed gear 3 is prescribed by an inside straight line 52 extending parallel to the center axis 1a from a region 51 connected to the external tooth formation portion 12 to the barrel-side end part D. An outer circumferential surface portion of the cylinder portion 13 is also prescribed by an outside straight line 53 extending parallel to the center axis 1a. The cylinder portion 13 having a constant thickness is prescribed by the inside straight line 52 and the outside straight line 53.

An inner circumferential surface portion of the curved portion 23 of the diaphragm 20 connected to the cylinder portion 13 is prescribed by a recessed arc 55. One end of the recessed arc 55 is smoothly connected to the inside straight line 52 at the position of the barrel-side end part D. An outer circumferential surface portion of the curved portion 23 is prescribed by an extended-straight-line end portion of the outside straight line 53 extending past the barrel-side end part D, a convex arc 57 smoothly connected to the extended straight line portion 53a, and a straight line portion 58 which is smoothly connected to another end of the convex arc 57 and which extends radially outward.

In the curved portion 23, a middle position of the curved portion from the inner circumferential end A to the barrel-side end part D is designated as E. In the curved portion 23, a curvature radius of the outside convex arc 57 is smaller than the curvature radius of the inside recessed arc 55. A wall thickness of the curved portion 23 is greatest at the curved-portion middle position E, gradually increases from the inner circumferential end A to the curved-portion middle position E, and gradually decreases from the curved-portion middle position E to the barrel-side end part D.

A barrel-side end surface portion of the diaphragm body portion 22 connected to the curved portion 23 is prescribed by a compound recessed curve 59. A middle part between the inner circumferential end A and the outer circumferential end C in the diaphragm body portion 22 is designated as B. The compound recessed curve 59 is constituted from a recessed arc 59a prescribed from the inner circumferential end A to the middle part B, and a recessed arc 59b prescribed from the middle part B to the outer circumferential end C, for example. One end of the recessed arc 59a is smoothly connected to the recessed arc 55 at the position of the inner circumferential end A, and another end of the recessed arc 59a is smoothly connected to the recessed arc 59b.

An end surface portion on an opposite side of the diaphragm body portion 22 is prescribed by a straight line 58 extending past the inner circumferential end A from an end of a straight line portion 58a. The straight line 58 extends to a position of the outer circumferential end C along the radial direction perpendicular to the center axis 1a.

A thickness of the diaphragm body portion 22 prescribed by the compound recessed curve 59 and the straight line 58 is smallest in the middle part B, gradually increases from the middle part B to the inner circumferential end A, and gradually increases from the middle part B to the outer circumferential end C.

A barrel-side end surface portion of the boss base portion 21 connected to the outer circumferential end C of the diaphragm body portion 22 is prescribed by an arc portion of the recessed arc 59b of the compound recessed curve 59 that extends past the outer circumferential end C. An end of the recessed arc 59b is connected to a straight line 61 that prescribes an end surface of the boss 30 on the same side thereof.

An end surface portion on an opposite side of the boss base portion 21 is prescribed by a compound recessed curve 63 smoothly connected to an end of the straight line 58 at the position of the outer circumferential end C. Another end of the compound recessed curve 63 is smoothly connected to the circular inner circumferential surface 31 of the boss 30. A streamline disclosed in Patent Document 3 (JU S61-173851 A) can be used as the compound recessed curve 63. A thickness of the boss base portion 21 increases from the position of the outer circumferential end C to the circular inner circumferential surface 31.

Where thicknesses of the inner circumferential end A, the middle part B, the outer circumferential end C, the barrel-side end part D, and the curved-portion middle position E in the diaphragm 20, the thicknesses are designated as t(A), t(B), t(C), t(D), and t(E), respectively, they are set so that $$t(E)>t(A)>t(C)>t(D)>t(B)$$

is satisfied.

The thicknesses of the inner circumferential end A, the outer circumferential end C, the barrel-side end part D, and the curved-portion middle position E are preferably set as described below, with reference to the thickness t(B) of the middle part B, the thickness t(B) having the smallest thickness.

The thickness t(A) of the inner circumferential end A satisfies $$1.2<t(A)/t(B)<2.7;$$

the thickness t(C) of the outer circumferential end C satisfies $$1.0<t(C)/t(B)<2.3;$$

the thickness t(D) of the barrel-side end part D satisfies $$1.0<t(D)/t(B)<2.3; \text{ and}$$

the thickness t(E) of the curved-portion middle position E satisfies $$1.3<t(E)/t(B)<2.8.$$

In the externally toothed gear 3 in the present example, the thickness t(D) of the barrel-side end part D of the curved portion 23 of the diaphragm 20 is greater than the t(B) of the middle part B, which is the portion of the diaphragm 20 having the smallest thickness, as described above. The thickness t(A) of the inner circumferential end A of the diaphragm 20, using the thickness t(B) of the middle part of the diaphragm 20 as a reference, is set so as to be greater than in the case of the conventional silk-hat-shaped externally toothed gear. Furthermore, the thickness t(E) of the curved-portion middle position E is set so that the curved-portion middle position E is the portion of the diaphragm 20 having the greatest thickness.

When a thrust force acts on the silk-hat-shaped externally toothed gear 3, stress is concentrated in a portion of the diaphragm body portion 22 near the outer circumferential end C and a portion of the diaphragm body portion 22 near the inner circumferential end A. Through experimentation, the inventors confirmed that when the thickness of each part of the externally toothed gear 3 is set as described above, concentrated stress due to thrust force in an operating state of high load torque can be reduced by 20-40% in each model number of silk-hat-type strain wave gearing. The inventors also confirmed that setting the thickness of the diaphragm 20 in the manner described above is effective for suppressing or avoiding breakage of the diaphragm 20 in an operating state of high load torque. The inventors furthermore confirmed that setting the thickness of the diaphragm 20 in the manner described above is effective for enhancing torsional rigidity and buckling strength of the externally toothed gear 3.

The invention claimed is:

1. An externally toothed gear configured to be used for a strain wave gearing, in which the externally toothed gear is ellipsoidally flexed by a wave generator to form a state of partial meshing with a rigid internally toothed gear, the externally toothed gear comprising:
   a cylindrical barrel provided with one end being an open end; external teeth formed on a portion of an outer circumferential surface of the barrel on a side of the open end thereof; a diaphragm which is continuous with another end of the barrel and spreads outward in a radial direction of the barrel; and an annular boss formed continuously with an outer circumferential end of the diaphragm,
   wherein the diaphragm comprises:
   a diaphragm body portion extending in the radial direction;
   a curved portion which is continuous with an inner circumferential end of the diaphragm body part, curves toward the barrel along a center axis from a direction inward in the radial direction, and is connected to the barrel; and
   a boss base portion which extends outward in the radial direction from an outer circumferential end of the diaphragm body part, and is connected to an inner circumferential surface of the boss; and
   wherein a thickness of the diaphragm gradually decreases from a position of the boss base portion connected to the inner circumferential surface of the boss to a middle part between the outer circumferential end and the inner circumferential end in the diaphragm body part, and the thickness of the diaphragm gradually increases from the middle part to the inner circumferential end of the diaphragm body part; and
   wherein thicknesses of the inner circumferential end, the middle part, and the outer circumferential end of the diaphragm, and a thickness of a barrel-side end part of the curved portion connected to the barrel satisfy $$t(A)>t(C)>t(D)>t(B),$$

where t(A) is the thickness of the inner circumferential end, t(B) is the thickness of the middle part, t(C) is the thickness of the outer circumferential end, and t(D) is the thickness of the barrel-side end part.

2. The externally toothed gear for the strain wave gearing according to claim 1,
   wherein, with reference to the thickness t(B) of the middle part of the diaphragm body portion,
   the thickness t(A) of the inner circumferential end satisfies $$1.2<t(A)/t(B)<2.7;$$

the thickness t(C) of the outer circumferential end satisfies $$1.0<t(C)/t(B)<2.3; \text{ and}$$

the thickness t(D) of the barrel-side end part satisfies $$1.0<t(D)/t(B)<2.3.$$

3. The externally toothed gear for the strain wave gearing according to claim 1,
   wherein the thickness of the diaphragm gradually increases from the inner circumferential end to a curved-portion middle position between the inner circumferential end and the barrel-side end part, and gradually decreases from the curved-portion middle position to the barrel-side end part,
   wherein a thickness t(E) of the curved-portion middle position satisfies $$t(E)>t(A); \text{ and}$$

wherein, with reference to the thickness t(B) of the middle part, $$1.3<t(E)/t(B)<2.8$$

is satisfied.

4. The externally toothed gear for the strain wave gearing according to claim 1,
   wherein the barrel comprises an external tooth formation portion where the external teeth are formed, and a cylinder portion from the external tooth formation portion to the barrel-side end part of the curved portion, and a thickness of the cylinder portion is constant and is the same as the thickness t(D) of the barrel-side end part.

5. The externally toothed gear for the strain wave gearing according to claim 1, wherein the thickness of the diaphragm gradually increases from the inner circumferential end of the curved portion to a curved-portion middle position between the inner circumferential end and the barrel-side end part, and gradually decreases from the curved-portion middle position to the barrel-side end part, wherein a thickness t(E) of the curved-portion middle position satisfies $t(E) > t(A)$, and wherein, with reference to the thickness t(B) of the middle part, the thickness t(A) of the inner circumferential end satisfies $1.2 < t(A)/t(B) < 2.7$, the thickness t(C) of the outer circumferential end satisfies $1.0 < t(C)/t(B) < 2.3$, the thickness t(D) of the barrel-side end part satisfies $1.0 < t(D)/t(B) < 2.3$, and a thickness t(E) of the curved-portion middle position satisfies $1.3 < t(E)/t(B) < 2.8$.

6. A strain wave gearing comprising:
an annular rigid internally toothed gear;
the externally toothed gear as set forth in claim 1; and
a wave generator for flexing the externally toothed gear in a radial direction thereof to partially mesh with the internally toothed gear and for moving meshed positions between the gears in a circumferential direction.

* * * * *